US009841588B2

(12) United States Patent
Johnson

(10) Patent No.: US 9,841,588 B2
(45) Date of Patent: Dec. 12, 2017

(54) TELESCOPE AND BEAM EXPANDER ASSEMBLIES

(71) Applicant: Goodrich Corporation, Charlotte, NC (US)

(72) Inventor: James B. Johnson, Medford, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/964,129

(22) Filed: Dec. 9, 2015

(65) Prior Publication Data

US 2017/0168276 A1 Jun. 15, 2017

(51) Int. Cl.
| | |
|---|---|
| *G02B 17/08* | (2006.01) |
| *G02B 23/02* | (2006.01) |
| *G02B 23/12* | (2006.01) |
| *G02B 27/00* | (2006.01) |
| *G01C 3/00* | (2006.01) |
| *F41G 3/06* | (2006.01) |

(52) U.S. Cl.
CPC ........... *G02B 17/0808* (2013.01); *F41G 3/06* (2013.01); *G01C 3/00* (2013.01); *G02B 17/0856* (2013.01); *G02B 23/02* (2013.01); *G02B 23/12* (2013.01); *G02B 27/0025* (2013.01)

(58) Field of Classification Search
CPC .... G02B 17/0808; G02B 23/02; G02B 23/12; G02B 27/0025; G02B 17/0856; G02B 5/04; G02B 27/0172; G02B 23/2407; G02B 23/00; G02B 23/2484; G02B 23/06; G02B 23/10; G02B 23/105; G01C 3/00; G03B 21/28; F41G 3/06

USPC .................................................. 359/399–431
See application file for complete search history.

(56) References Cited

U.S. PATENT DOCUMENTS

| | | | |
|---|---|---|---|
| 3,527,526 | A | 9/1970 | Silvertooth |
| 4,439,012 | A | 3/1984 | Christy |
| (Continued) | | | |

FOREIGN PATENT DOCUMENTS

JP         H03287868 A         2/1991

OTHER PUBLICATIONS

Xiao et al., "New Type Optical Cassegrain Antenna with Lenses Telescope System", Optik, Wissenschaftliche Verlag GMBH, DE, vol. 121, No. 6, Mar. 1 2010 (5 pages).

(Continued)

*Primary Examiner* — Stephone B Allen
*Assistant Examiner* — Rahman Abdur
(74) *Attorney, Agent, or Firm* — Locke Lord LLP; Scott D. Wofsy; Joshua L. Jones

(57) ABSTRACT

A telescope and beam expander assembly includes a primary telescope mirror. An optical element is spaced apart from the primary mirror. The optical element includes front and rear surfaces, wherein an outward facing aspect of the rear surface is mounted opposite the primary mirror and includes a reflective portion that forms a secondary mirror to reflect gathered light from the primary mirror toward a focal point. An inward facing aspect of the front surface includes a reflective portion that forms a secondary expander mirror configured to reflect a beam onto an inward facing aspect of the rear surface for beam expansion. The optical element can include a monolithic body of optically-transmissive material on which the front and rear surfaces are located.

14 Claims, 1 Drawing Sheet

(56) References Cited

U.S. PATENT DOCUMENTS

| | | | |
|---|---|---|---|
| 7,656,526 B1 * | 2/2010 | Spuler | G01N 21/538 356/336 |
| 7,843,650 B1 | 11/2010 | Roberts | |
| 2010/0284099 A1 * | 11/2010 | Guyer | G02B 17/061 359/858 |

OTHER PUBLICATIONS

Extended European Search Report dated Mar. 24, 2017, issued during the prosecution of European Patent Application No. EP 16201480.7 (8 pages).

* cited by examiner

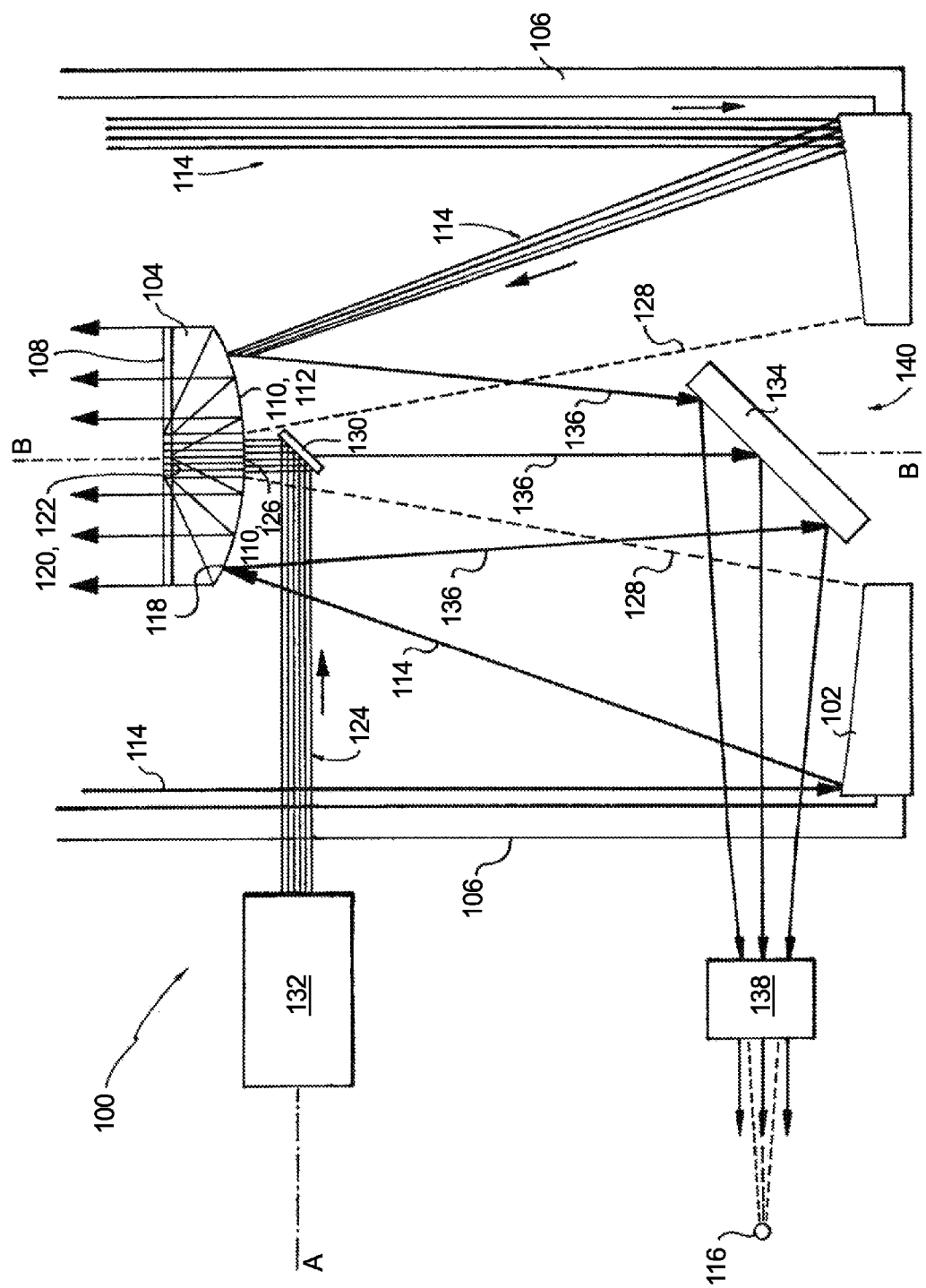

TELESCOPE AND BEAM EXPANDER ASSEMBLIES

BACKGROUND OF THE INVENTION

1. Field of the Invention

The present disclosure relates to optics, and more particularly to optical components such as used in telescopes and cameras.

2. Description of Related Art

Laser beams can be used at long range in various applications, including communications, range finding, and others. For long range use of a laser beam, the diameter of the beam must increase quadratically with distance to maintain collimation over that range. This results in large optics where long range collimation is required, e.g., for laser range finders used over multi-mile ranges. Such large optics can present design challenges. For example, it can be a challenge to house large optics in size constrained systems. In the application of long range communication, one solution has been described in U.S. Pat. No. 7,843,650 to Roberts, which describes a monolithic afocal telescope used as a beam expander in reverse to concentrate communications laser beams on the receiving end.

Such methods and systems have generally been considered satisfactory for their intended purpose. However, there is still a need in the art for improved optics such as beam expanders and related systems. The present disclosure provides a solution for this need.

SUMMARY OF THE INVENTION

A telescope and beam expander assembly includes a primary telescope mirror. An optical element is spaced apart from the primary mirror. The optical element includes front and rear surfaces, wherein an outward facing aspect of the rear surface is mounted opposite the primary mirror and includes a reflective portion that forms a secondary mirror to reflect gathered light from the primary mirror toward a focal point. An inward facing aspect of the front surface includes a reflective portion that forms a secondary expander mirror configured to reflect a beam onto an inward facing aspect of the rear surface for beam expansion. The optical element can include a monolithic body of optically-transmissive material on which the front and rear surfaces are located.

The front surface of the optical element can include an optically transmissive, non-reflective portion that is substantially flat. The reflective portion of the front surface can be aspheric. The rear surface can be aspheric, and the non-reflective portion of the front surface can define a complementary curve to that of the rear surface to correct for aberration in beam expansion. The rear surface can define a curvature constrained to conform to optical properties of the primary mirror for focusing light gathered by the primary mirror. The rear surface can include an optically transmissive, non-reflective portion for admitting a beam through the rear surface toward the reflective portion of the front surface for beam expansion. The non-reflective portion of the rear surface can be substantially flat. The optical element can define an obscuration shadow with respect to the primary mirror, and the non-reflective portion of the rear surface can be positioned in the obscuration shadow.

An angled mirror for beam expansion can be included within the obscuration shadow for reflecting a beam from an axis angled relative to an expander axis defined by the optical element into the optical element for beam expansion. A beam generator can be operatively connected to the beam expander for beam expansion. A telescope axis can be defined by the secondary mirror, and a telescope angled mirror can be included within the obscuration shadow for reflecting focused light from the secondary mirror aligned relative to the telescope axis towards a focal point lateral of the telescope axis. Optics can be operatively connected to the optical element to form images from light gathered by the primary mirror.

The optical element can be aligned with an aperture through the primary mirror. The optical element and the primary mirror can be arranged to function as a telescope and beam expander that are bore sited to one another.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic cross-sectional side elevation view of an exemplary embodiment of a telescope and beam expander assembly constructed in accordance with the present disclosure, showing the optical element serving both as a beam expander and as a secondary mirror for the telescope.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of a telescope and beam expander assembly in accordance with the disclosure is shown in FIG. 1 and is designated generally by reference character 100. The systems and methods described herein can be used for long range laser beam applications such as range finding and communications.

Telescope and beam expander assembly 100 includes a primary telescope mirror 102 mounted in a housing 106 or other suitable structure. An optical element 104 is mounted spaced apart from primary mirror 102, e.g., suspended from housing 106 using a telescope spider, corrector plate, or the like. Optical element 104 includes a front surface 108 and an opposed rear surface 110. Optical element 104 includes a monolithic body of optically-transmissive material on which the front and rear surfaces 108 and 110 are located. For example, optical element 104 can be made of single piece of glass such as fused silica or any other suitable material, with suitable coatings.

The outward facing aspect of rear surface 110 is mounted opposite primary mirror 102 and includes a reflective portion 112 that forms a secondary mirror to reflect gathered light 114 from primary mirror 102 toward a focal point 116. The reflective portion 112 of rear surface 110 is aspheric. An inward facing aspect 120 of the front surface 108 includes a reflective portion 122 that forms a secondary expander mirror configured to reflect a beam 124 onto an inward facing aspect 118 of rear surface 110 for beam expansion. For example, the curvatures of reflective portion 122 and inward aspect 118 can be configured to form a Cassegrain beam expander. Those skilled in the art will readily appreciate that the Cassegrain configuration is just one exemplary configuration, and that any other suitable configuration can be used without departing front the scope of this disclosure, for example, a Ritchey-Chretien configuration can be used. The optically transmissive, non-reflective portion of front surface 108 is substantially flat, and the reflective portion 122 of front surface 108 is aspheric. The non-reflective portion of front surface 108 can optionally define a complementary curve to that of rear surface 110 to correct for aberration in beam expansion.

The reflective portions 122 and 112 of front and rear surfaces 108, 110 can be coated with a reflective material, e.g., can be silvered, to provide reflectivity. The remainder of front and rear surfaces 108 and 110 can be free of reflective coatings for transmission of light therethrough, and these surfaces that do not have a reflective coating can possess an anti-reflective coating tuned to the wavelength of beam 124. Reflective portion 112 of rear surface 110 is reflective on both its outward aspect and its inward aspect 118 because this rear surface 110 operates as both the secondary mirror for the telescope with primary mirror 102, and as the primary mirror for beam expansion. In other words, optical element 104 is both the secondary mirror for primary mirror 102 and a beam expander.

Rear surface 110 defines a curvature that is constrained to conform to the optical properties of primary mirror 102 for focusing light 114 gathered by primary mirror 102, so optical element 104 serves as the secondary mirror for primary mirror 102. Rear surface 110 can also be configured to reduce spherical aberration of beam 124 in beam expansion. For example, primary mirror 102 and rear surface 110 can form a two mirror Cassegrain telescope. Those skilled in the art will readily appreciate that the Cassegrain configuration is just one exemplary configuration, and that any other suitable configuration can be used without departing front the scope of this disclosure, for example, a Ritchey-Chretien configuration can be used. Rear surface 110 includes an optically transmissive, non-reflective portion 126 for admitting beam 124 through the rear surface toward the reflective portion 122 of front surface 108 for beam expansion. The non-reflective portion 126 is substantially flat, or optionally curved to follow the curve of inward aspect 118.

Optical element defines an obscuration shadow 128 with respect to primary mirror 102, as indicated with broken lines in FIG. 1. Non-reflective portion 126 of rear surface 110 is positioned in obscuration shadow 128. An angled mirror 130 for beam expansion can be included within obscuration shadow 130 for reflecting beam 124 from an axis A, which is angled relative to an expander axis B defined by optical element 104, into the optical element 104 for beam expansion along axis B. A beam generator 132, e.g., a laser, can be operatively connected to the beam expander for beam expansion.

A telescope axis is defined by the secondary mirror, which is the same as expander axis B. A telescope angled mirror 134 is included within the obscuration shadow 128 for reflecting focused light 136 from the secondary mirror aligned relative to the telescope axis B towards a focal point 116 lateral of the telescope axis B. Optics 138 are operatively connected to the optical element 104 to form images from light 114 gathered by primary mirror 102. For example, optics 138 can include a lens assembly configured to collimate reflected light 136, as indicated schematically by the three parallel arrows extending from optics 138 in FIG. 1. It is also contemplated that a fold mirror can instead be positioned behind primary mirror 102, for example. Optionally, mirror 134 can be eliminated, and optics 138 can be positioned outside of housing 106 along telescope axis B wherein reflected light 136 passes through aperture 140 in primary mirror 102. Optical element 104 is aligned with aperture 140.

Assembly 100 provides functionality both of a telescope and of a beam expander. The telescope functionality is described as follows. Light 114 is gathered and reflected by primary mirror 102. The light reflected from primary mirror 102 is reflected again from the secondary mirror, e.g., the outward aspect of reflective portion 112 of rear surface 110 of optical element 104. The secondary mirror focuses the light into focused light 136, which passes through optics 138 to form a telescopic image. The beam expander functionality is described as follows. Beam generator 132 projects a collimated beam 124 towards angled mirror 130, which directs beam 124 into optical element 104 through non-reflective portion 126 thereof. Beam 124 is reflected from reflective portion 122 of front surface 108 onto the inward aspect 118 of rear surface 110, which collimates the expanded beam, which passes out through the non-reflective portion of front surface 108, as represented by the vertical arrows pointed upward from optical element 104 in FIG. 1. Since the axes B of the expander and telescope are one and the same, the telescope and beam expander are boresited to one another. Thus the spot illuminated by the beam expander can be viewed and/or imaged at distance through the telescope.

Combining functionality of telescope secondary mirror and beam expander in a single optical element 104 provides compactness compared to systems where beam expander and telescope components are separate. An existing telescope can be retrofitted, by replacing the secondary mirror with optical element 104, to provide the combined telescope and beam expander functionality described herein, e.g., without the need to cut a new optical aperture within the system. The monolithic structure of optical element 104 also provides mechanical stability, and because it is located within the telescope, it is relatively easy to boresight a camera field of view for the telescope with the beam expander.

The methods and systems of the present disclosure, as described above and shown in the drawings, provide for long range laser devices with superior properties including compact device size relative to traditional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A telescope and beam expander assembly comprising:
a primary telescope mirror;
an optical element spaced apart from the primary mirror, the optical element including front and rear surfaces, wherein an outward facing aspect of the rear surface is curved and is mounted opposite the primary mirror and includes a reflective portion that forms a secondary mirror to reflect gathered light from the primary mirror toward a focal point, wherein an inward facing aspect of the front surface includes a reflective portion that forms a secondary expander mirror configured to reflect a beam onto an inward facing aspect of the rear surface for beam expansion, wherein the optical element includes a monolithic body of optically-transmissive material on which the front and rear surfaces are located, wherein the reflective portion of the rear surface is reflective on both its outward aspect and its inward aspect to operate as both a secondary mirror for the primary mirror and as a primary beam expansion mirror.

2. The assembly as recited in claim 1, wherein the front surface includes an optically transmissive, non-reflective portion that is substantially flat.

3. The assembly as recited in claim 1, wherein the reflective portion of front surface is aspheric.

4. The assembly as recited in claim 1, wherein the rear surface is aspheric.

5. The assembly as recited in claim 1, wherein a non-reflective portion of the front surface defines a complementary curve to that of the rear surface to correct for aberration in beam expansion.

6. The assembly as recited in claim 1, wherein the rear surface defines a curvature constrained to conform to optical properties of the primary mirror for focusing light gathered by the primary mirror.

7. The assembly as recited in claim 1, wherein the rear surface includes an optically transmissive, non-reflective portion for admitting a beam through the rear surface toward the reflective portion of the front surface for beam expansion.

8. The assembly as recited in claim 7, wherein the non-reflective portion of the rear surface is substantially flat.

9. The assembly as recited in claim 7, wherein the optical element defines an obscuration shadow with respect to the primary mirror, and wherein the non-reflective portion of the rear surface is positioned in the obscuration shadow.

10. The assembly as recited in claim 9, further comprising an angled mirror for beam expansion within the obscuration shadow for reflecting a beam from an axis angled relative to an expander axis defined by the optical element into the optical element for beam expansion.

11. The assembly as recited in claim 1, further comprising a beam generator operatively connected to the beam expander for beam expansion.

12. The assembly as recited in claim 1, wherein a telescope axis is defined by the secondary mirror, and wherein a telescope angled mirror is included within an obscuration shadow for reflecting focused light from the secondary mirror aligned relative to the telescope axis towards a focal point lateral of the telescope axis.

13. The assembly as recited in claim 1, further comprising optics operatively connected to the optical element to form images from light gathered by the primary mirror.

14. The assembly as recited in claim 1, wherein the optical element and the primary mirror are arranged to function as a telescope and beam expander that are boresited to one another.

* * * * *